Aug. 19, 1958     F. E. WOODRUFF     2,847,993
METHOD AND MEANS FOR THE PREVENTATIVE
VACCINATION OF CHICKENS
Filed May 21, 1952     2 Sheets-Sheet 1
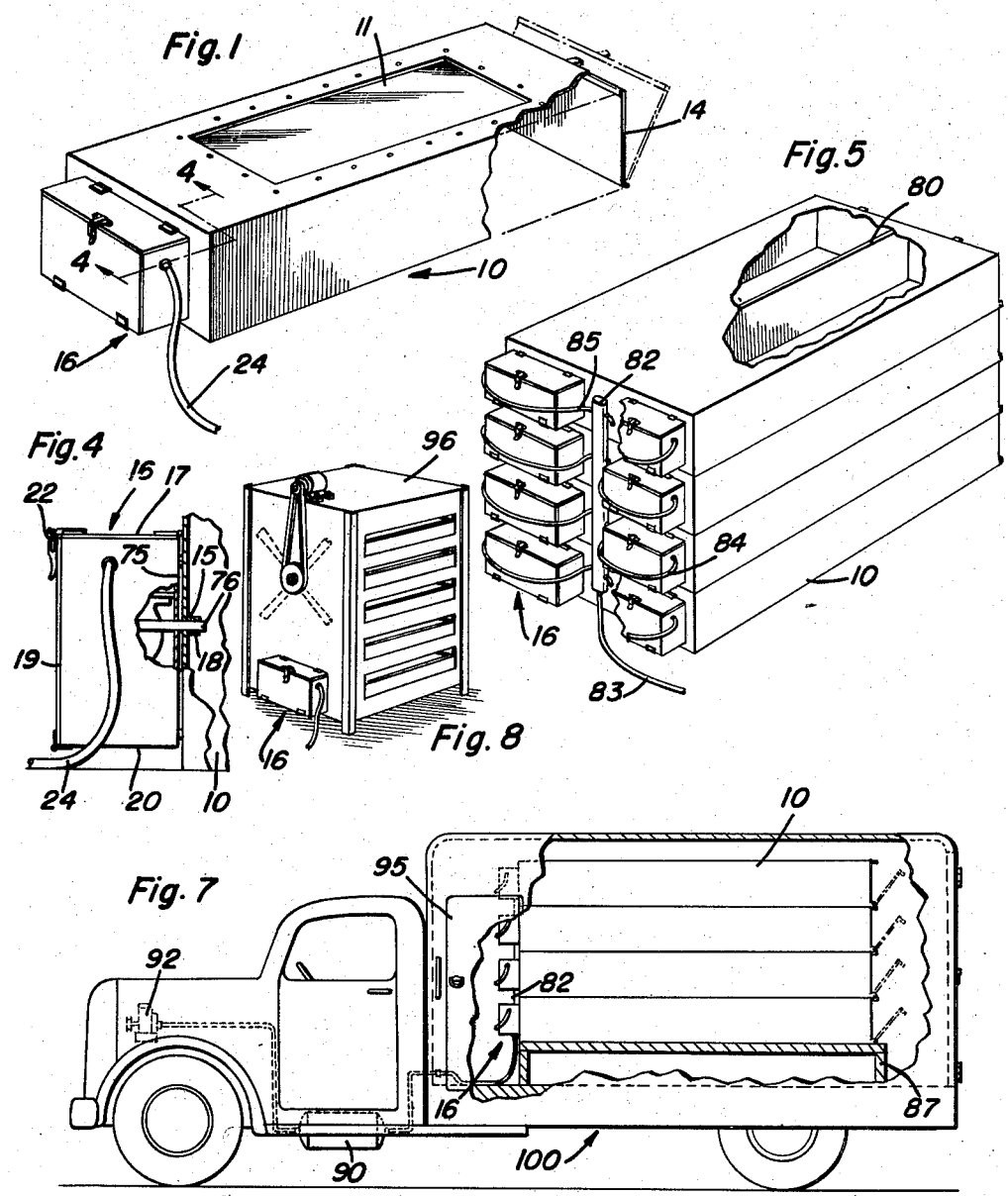
Frederick E. Woodruff
INVENTOR.
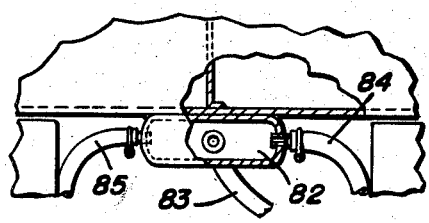

Aug. 19, 1958    F. E. WOODRUFF    2,847,993
METHOD AND MEANS FOR THE PREVENTATIVE
VACCINATION OF CHICKENS
Filed May 21, 1952    2 Sheets-Sheet 2

Frederick E. Woodruff
INVENTOR.

United States Patent Office 2,847,993
Patented Aug. 19, 1958

2,847,993

METHOD AND MEANS FOR THE PREVENTATIVE VACCINATION OF CHICKENS

Frederick E. Woodruff, Montrose, Pa.

Application May 21, 1952, Serial No. 289,173

9 Claims. (Cl. 128—191)

This invention relates to a method, system and apparatus for the preventative vaccination of chickens and it is more specifically adapted to the vaccination of chickens against the so-called Newcastle disease, against infectious bronchitis and against some similar infectious respiratory diseases.

Newcastle disease, also known as avian pneumo-encephalitis, is a respiratory nerve virus infection of poultry which, in the case of mass infection, cannot be effectively treated after it has occurred, but which is best controlled by preventative vaccination rather than by treatment.

Preventative vaccination to build up a resistance against this disease has hitherto been usually performed when chickens were eight to twelve weeks old in the same manner and at the same time with the vaccination for fowl pox. If vaccination is carried out in this way and if a live attenuated vaccine is used an immunity is produced which is carried through the following egg laying season. Chicks hatched from immunized birds seem to have some immunity after hatching which however disappears very rapidly so that the chicks are susceptible by the time they are two to four weeks old.

Therefore, whether or not the birds of a flock from which the chickens are hatched are immunized, it is clear that vaccination, after the birds are eight to twelve weeks old, occurs at a time which is too late to prevent an outbreak of the disease and that a chicken should be vaccinated as soon as received or when hatched or soon after having been hatched, and even if the chicks are known to have been hatched from eggs laid by immunized birds they should be vaccinated not later than two to four weeks after hatching.

It has already been proposed to develop a vaccine against the respiratory nerve virus infection which has been above mentioned by using an atomized, tissue cultured virus held in a suitable artificial fluid medium which virus, after a large number of passages, is sufficiently attenuated and has lost its virulence so that it produces immunity without producing a large number of deaths.

It has also been proposed to spray the attenuated atomized, tissue cultured virus in a closed room into which the birds to be immunized are introduced.

While these theoretical suggestions are valuable they do not solve the practical problem connected with the vaccination of a very large number of chickens and more specifically of chickens which are still at a rather tender age. For instance, chickens being two to four weeks old cannot be vaccinated individually with this particular vaccine alone or together with fowl pox vaccination. It is also difficult to spray vaccines in a chicken coop in which the chickens are being held so as to expose the chickens to the vaccine and it is necessary to so diffuse the vaccine that it will be inhaled without difficulty and will not merely form a deposit on the walls or on the objects or on the body of the chickens.

The invention has for its main object to provide a method whereby a very large number of chickens of any age group, even chickens which are a day old, may be vaccinated without serious loss.

A further principal object of the invention consists in providing simple means for producing immunization or vaccination by the inhalation of extremely finely sprayed vaccine which is carried by an air stream introduced into a substantially closed box into which the chickens are introduced and in which they are exposed to the vaccine for a limited period, the treatment being such that chickens of any age group may be treated without endangering them.

A further object of the invention consists in providing special means for finely dividing and spraying the vaccine so that nebulized particles or droplets of the vaccine carrier remain suspended in the air for a much longer period of time than the period during which the chickens are exposed to the air charged with the droplets or particles in order that the vaccine may be inhaled with the air and enter the body through the respiratory organs without causing an unfavorable reaction.

A further object of the invention consists in a suitable vaccination arrangement by means of which air under a raised and exactly regulable pressure, loaded to a predetermined extent with suspended particles of vaccine may be passed through a substantially closed box or container in which the chickens are held for a short period of time during which they are exposed to the vaccine.

A further object of the invention consists in providing suitable containers and boxes for holding the chickens during treatment, associated with other boxes containing the spraying arrangement, which boxes may be easily joined to each other and separated from each other in order to carry out the vaccination process in the shortest possible time with a large number of chickens.

A further object of the invention consists in arranging the spraying apparatus as well as the means for producing a raised air pressure and all further means, together with the boxes in which the chickens are held, on a vehicle so that the immunization of the chickens may take place on the vehicle and the immunization equipment may be brought to the individual chicken farm where vaccination is to be carried out.

A number of further objects of a more specific nature will become apparent from the following detailed specification.

The invention is illustrated in the accompanying drawings, but it will be understood that the equipment which has been illustrated is shown by way of example only and that neither the drawing nor the specification intend to give a survey of the possible modifications to which this equipment may be subjected. More specifically, the drawing illustrates a preferred embodiment of the invention with the express understanding that the illustrations have been so selected that the principle of the invention may be clearly seen and may be explained with reference to said drawings while the said drawings at the same time show means for applying said principle. However departures from the embodiment of the invention which has been illustrated do not necessarily involve a departure from the principle of the invention.

In the drawing:

Figure 1 is a perspective view of an immunization or vaccination arrangement showing a box in which chickens may be held during the vaccination process associated with the box which produces the spraying of the vaccine.

Figure 4 is a partly sectional view of the end of the closable box in which the chickens are housed during vaccination and of the box containing the spraying unit adjacent to the first named box, the section being taken along the line 4—4 of Figure 1.

Figure 5 is a perspective view through a number of stacked subdivided boxes each subdivision of which is provided with a spraying unit.

Figure 6 is a partly sectional plan view of the front part of the stacked subdivided box.

Figure 7 is a partly sectional elevational view of a truck carrying the complete immunization or vaccination equipment.

Figure 8 is a perspective view of an incubator provided with means for attaching the box which produces the spraying of the vaccine.

Figure 2:
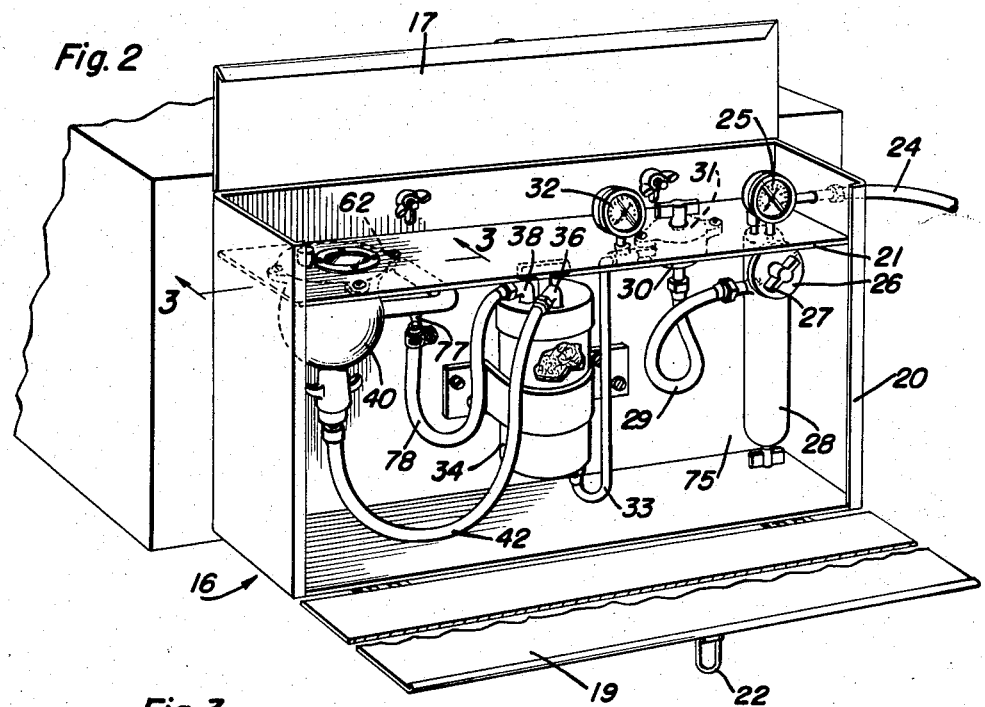
Figure 2 is a perspective view of the equipment which serves to load the air with particles of the vaccine before the air is introduced into the box in which the vaccination takes place.

As above explained the vaccination method according to the invention essentially consists in introducing a number of chickens into a closed space or chamber and in passing through said space or chamber air under somewhat raised predetermined and finely regulable pressure which air is loaded with vaccine, the latter being carried by a fluid which has been atomized or nebulized to such an extent that the particles or droplets of the fluid are of extreme fineness and are suspended in the air in which they are evenly distributed. If suitable quantities of air are passed through the space or chamber in which the chickens are treated the chickens will inhale a sufficient quantity of the vaccine producing immunization. As soon as it may be assumed that the necessary quantity of the vaccine has been picked up by the chickens the passage of vaccine loaded air is stopped and the box or cage containing the chickens is removed from the spraying apparatus and the chickens may be released.

The vaccination equipment according to the invention essentially consists of the closable cage or box 10 or of a number of closable cages or boxes for holding the chickens during vaccination and in a vaccine spraying unit provided with means for loading a pressurized air stream which is injected into the cages or boxes with extremely small finely divided and evenly distributed fluid particles containing the attenuated virus forming the vaccine. The spraying unit is preferably contained in a small box 16 which is detachably attached to or held against the closable cages or boxes 10 in such a manner that the discharge pipe of the spraying unit is joined to and leading into the said closable box or cage 10. The latter is thus supplied with a stream of air loaded with the atomized or nebulized fluid particles which are the carriers of the vaccine.

The drawing shows the cages or boxes with attached spraying unit and also a modification of the invention in which a large number of closable cages or boxes are stacked and in which the cages or boxes are of such size that they are preferably subdivided, each subdivision being provided with a separate vaccine nebulizer or atomizer. Further, a special application of this modification is shown in which the cages or boxes, the atomizer and the entire operative arrangement for the atomizer are all mounted on a vehicle, such as a truck. It will be understood however that the mounting of the entire equipment on a vehicle is an additional improvement and that the basic equipment may as well be stationary and may be, for instance, part of the equipment of a chicken farm. The mobile equipment merely permits to perform preventative vaccination in any desired locality. The mobile equipment in this case forms a complete service unit which is usable as a means for servicing a large number of stations or farms from one center.

As above stated, a single vaccination unit comprises a closable box or cage 10 which may either be completely closed or which may be a cage without bottom in which the chickens are held during vaccination. Preferably on the top of the box or cage 10 a transparent window 11 or lid made of plexiglass or some other transparent plastic is provided which permits to observe the chickens during vaccination.

At the rear of the box preferably a movable hinged rear wall or lid 14 is provided especially in the case of a completely closed box. At the front end the box is provided with a sleeve 15 surrounding an opening 18 in the front wall of the box. Through this opening the discharge pipe or hose of the atomizer or nebulizer unit 16 is introduced.

Figure 3:
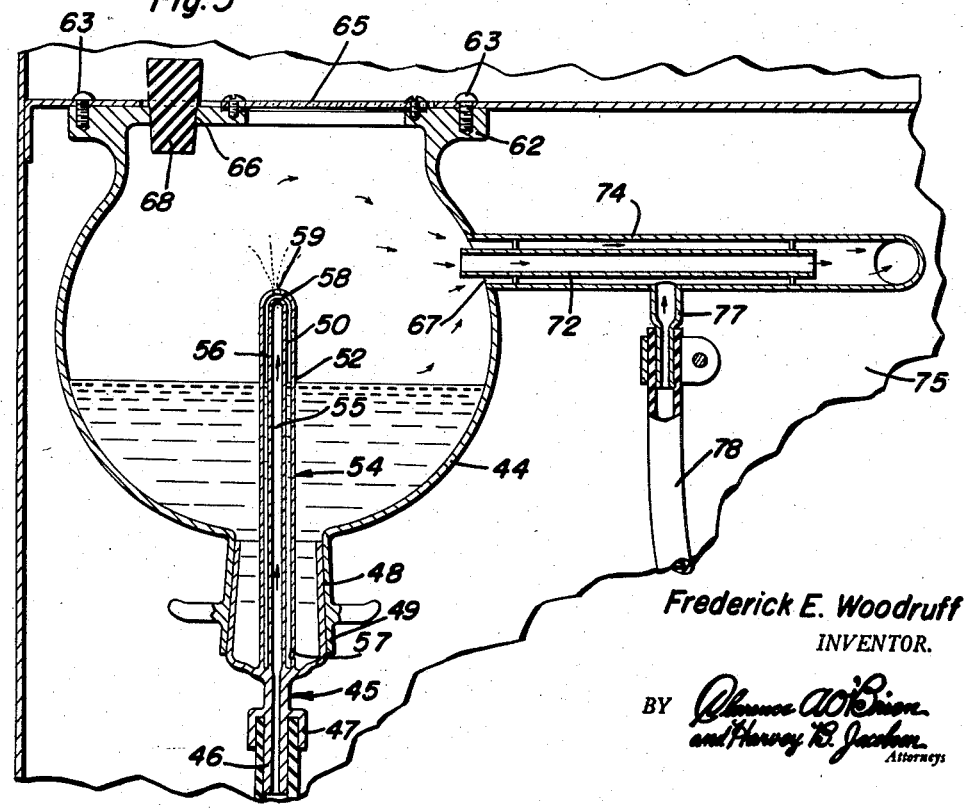
Figure 3 is a sectional view through the spraying vessel and apparatus, the section being taken along a line indicated at 3—3 in Figure 2.

The nebulizing or atomizer unit 16 is shown in detail in Figures 2 and 3, and comprises a case 20 which is provided with a movable and hinged front wall 19, and a movable and hinged top 17 which, when in the closed position may be locked to each other by means of a suitable locking mechanism 22. When open, however, the front wall and the lid may be moved so as to give complete access to the interior of the case 20.

In the modification illustrated the compressed air intake 24 leads from a suitable compressed air chamber or compressor (not shown in Figures 1 and 2) to a conventional high pressure and reduction valve 26 which may be adjusted by means of a control lever 27, which valve admits air under reduced pressure into a moisture eliminator 28 also of conventional construction from which the dry air is led through a suitable pipe or hose 29 to a precision air pressure control valve 30 controlling the low pressure under which the air is admitted to the apparatus. A pressure gauge 25 indicates the pressure of the air admitted to the high pressure valve 26 and a further pressure gauge 32 indicates the low pressure with which the air leaves the valve 30. A control lever 31 permits the exact regulation of the low pressure which must be regulated in accordance with the indication found on the gauge 32. It is to be understood that the units which have been above described are of conventional construction and are units which are currently manufactured for other purposes.

The low pressure air passes through a pipe or hose 33 into a filter casing 34 containing a glass wool filter or a filter of a similar type which is provided with two outlets 36 and 38. The outlet 36 is the outlet for the primary air and it is connected by means of a pipe or hose 42 with the atomizer or nebulizer generally indicated at 40.

The nebulizer or atomizer 40 consists essentially of two sections 44 and 45. The inner or tip section 45 is connected with the air intake or hose 42 and it comprises a tubular section 46 with an annular hanger sleeve 47. The intake pipe 42 is fitted over the tubular section and its end is held and covered by the hanger sleeve 47. Above the hanger sleeve 47 the tip section is provided with a preferably conical stopper sleeve 48 which fits into a corresponding neck portion 49 of the nebulizer vessel 44 which forms the second section of the nebulizer unit.

In the center of the stopper sleeve 48 and in alignment with the tubular portion 46 a spraying nozzle with concentric injector tubes 50, 52 is arranged which project from the stopper sleeve to such a distance that, when the stopper sleeve is inserted into the nebulizer vessel 44 they reach approximately the central region of the said nebulizer vessel.

The two concentric injector tubes 50, 52 have dome-shaped ends and the inner tube 50 surrounds a space 55 which is aligned with the axis of the tubular member 46. The air entering through the pipe or hose 42 therefore passes straight through the tube 46 and to the inner space surrounded by the inner injector tube 50. The tube 50 is surrounded by a space 56 contained between the two injector tubes 50 and 52.

The upper dome-shaped ends of both injector tubes are provided with aligned openings 58 and 59 through which the air coming in under pressure may pass into the atomizer or nebulizer vessel 44. The outer tube 52 is provided with an opening near its bottom 57 through which the fluid, which is filled into the vessel 44 and which also fills the interior of the sleeve 48 when the latter is inserted into the neck portion 49, may enter into the space 56 between the two injector tubes 50 and 52.

The nebulizer vessel 44 may be carried by the horizontal partition wall 21 of the case 20 and for this purpose the said vessel is provided with a circular flange 62 at its top portion which may be fixed to the partition wall by means of threaded bolts 63. The top of the nebulizer vessel is thus preferably closed but it may be provided with a transparent observation window 65 covered with a glass plate or with a plastic sheet which is preferably located in or below a suitable cut in the partition wall 21 so that the working of the injector in the nebulizer vessel may be observed from above when the lid 17 is open.

Further the top of the vessel has an opening 66 which is preferably closed by a stopper 68 which is also located below a cut portion of the partition wall 21 so that the stopper projects upwardly through the partition wall and may be removed in order to refill the nebulizing vessel after lifting the lid portion 17 and removing the stopper 68.

On the side of the vessel an opening 67 may be provided from which a discharge tube 72 leads away which tube is surrounded by an outer tube 74. At the end the said tube is bent and passes through an opening in the back wall 75 of the case 20. The bent portion 76, as seen in Figure 4, passes through the sleeve 15 and through the opening 18 into the closable cage or box 10.

The outer tube 74 is provided with a nipple 77 through which secondary air may enter. The nipple 77 is joined to a pipe or hose 78 which leads to be second outlet 38 of the glass wool filter 34.

Air under a regulable pressure is thus admitted to the spraying nozzle unit 54 formed by the two injector tubes 50 and 52 and more specifically to the cylindrical space 55 and on its way through the openings 58 and 59 exercises a suction which will cause some of the fluid in the space 56 to enter into the air stream. However this fluid is nebulized or atomized by the air stream and by the passage through the opening 59. The secondary air entering through the nipple 77 in the discharge tube forces the cloud of atomized fluid, formed in the vessel 44 out and carries it through the discharge tube 76 into the box or cage 10. The secondary air supply also provides a sufficient quantity of air for the box so that the latter is adequately supplied with air which is loaded with nebulized particles coming from the vessel or container 44.

Every closable cage or box 10 is provided with an atomizer unit 16. The boxes or cages 10 are however very large and especially if they are of a substantial width the boxes may be subdivided by vertical partition walls 80 and each subdivision is then provided with a special nebulizer or atomizer unit 16.

In the mobile vaccination arrangement which is shown in Figure 7 the width of the cages or boxes is made as large as possible and may be equal to the width of the vehicle on which it is carried. Further, for the mobile vaccination arrangement as well as for some of the stationary arrangements stacked boxes shown in Figures 5, 7 and 8 may be used. For such an arrangement especially for an arrangement in which the boxes are not only stacked but are also divided by a vertical partition wall it is preferable to use a common air conduit 82 which is connected with the high pressure container 90 by means of a pipe or hose 83. With this common air conduit 82 all the intake pipes 84, 85 of the nebulizer units 16 (corresponding to the intake pipe 24 in Figure 2) are connected. It is thus possible to use a single air supply pipe line for the compressed air for all the compartments of the stacked boxes.

According to the modification shown in Figure 7 the entire vaccination equipment is preferably mounted on a truck 100, the boxes or cages 10 being stacked on the loading platform of the truck which may be provided with a suitable base portion 87 for carrying the stacks. The boxes are again subdivided by longitudinal and vertical walls 80 to form a number of separate containers or chambers if the width of the truck permits the use of boxes of considerable width. Each of the subdivisions is provided with a nebulizer or atomizer unit 16 which units may all be supplied with high pressure air by means of a common supply tube 82. The high pressure air container 90 is in this case fixedly mounted on the truck in a suitable place and a compressor 92 may be driven by the engine of the truck by means of a belt or chain which replenishes the supply of compressed air in the container 90. The truck may of course be specially adapted for the purpose in question and may be provided with a rear door permitting insertion and removal of the boxes 10. Also a special door 95 giving access to the nebulizer unit 16 and similar specific devices and arrangements may be provided in order to facilitate the insertion, the removal, and the supervision and manipulation of the equipment.

Vaccination may also take place directly in the incubator in which the checks are hatched. This arrangement is illustrated in Figure 8 in which the front wall of an incubator 96 of a conventional type is provided with a suitable opening 18 and sleeve 15, such as shown in Figure 4, through which the tube 76 of the spraying unit is inserted. The spraying unit 16 is identical with that described in connection with Figures 1 to 4, and is enclosed in a box which is shown in the figure. Immunization thus may take place during hatching.

In actual operation the vaccine is prepared from a low strength virus isolated in the field and cultivated without modification and more specifically a low strength virus is used which does not need many passages for its attenuation. This virus is added to a suitable solution and, after the stopper 48 with the tip and the spraying nozzle 54 has been inserted into the neck portion 49 and is held firmly within the said portion the solution with the virus is filled into the vessel 44 to a suitable height which leaves the spray opening free. Air is then admitted under control to the filter and from there passes to the spraying unit 54 atomizing or nebulizing the fluid and escaping through the spray openings 58 and 59. Thus, in the vessel 44 a cloud of nebulized fluid will be formed which is then discharged into the tube 72 and by suction of the secondary air is carried into the box 10.

In each of the boxes 10 the chickens may be introduced separately, but a certain number of boxes may be treated simultaneously as seen in Figure 7 so as to shorten the time for the vaccination of a large flock.

Also special means such as belts or webs may be placed below each of the boxes so as to allow the removal of an individual box from the stack without having to remove all the other boxes on top of it and the same means may also be used for removing the entire stack from the truck.

It will be clear that a number of changes of an unessential nature can be made without in any way departing from the essence of the invention as defined in the annexed claims.

Having described the invention, what is claimed as new is:

1. Vaccination equipment for vaccinating a relatively large number of chickens simultaneously by means of a vaccine carried by a fluid carrier comprising a spraying unit for spraying and nebulizing a vaccine, including a spraying vessel partly filled with a vaccine carrying fluid, means for spraying the vaccine carrying fluid by compressed air in said spraying vessel, said spraying vaccine carrying fluid filling constantly part of the spraying vessel, a source of air under pressure connected with said spraying means, a closed elongated cage of constant cross-section with a floor space which is large relatively to its volume for confining and holding the number of chickens, means for connecting said closed cage with that part of the spraying vessel containing the vaccine carrying spray, means for producing an air stream connected with the source of air under pressure and further connected with the said connection between the spraying vessel and the cage, said last named means producing a constant secondary air stream entraining sprayed vaccine of the spraying vessel which air stream enters the elongated cage through the aforesaid connection and keeps the same filled with air carrying sprayed vaccine in a constant and predetermined proportion.

2. Mobile vaccination equipment for vaccinating a relatively large number of chickens simultaneously against respiratory nerve virus infection by means of a vaccine carried by a fluid carrier comprising a spraying unit for spraying and nebulizing a vaccine, including a spraying vessel partly filled with a vaccine carrying fluid, a spraying nozzle for spraying the vaccine by compressed air within said spraying vessel, a source of air under pressure connected with said spraying nozzle, said sprayed vaccine filling constantly a part of the spraying vessel at a pressure exceeding the atmospheric pressure, a closed elongated cage of constant cross-section with a floor space which is large relatively to its volume for confining and holding a number of chickens, a connection between said closed cage and that part of the spraying vessel containing the sprayed vaccine under a pressure exceeding the atmospheric pressure, an air conduit connected with a source of air under pressure and with the said connection between the spraying vessel and the cage conveying air under pressure exceeding the atmospheric pressure in the spraying vessel into the said cage through the said connection, means for entraining the sprayed vaccine from the spraying vessel by the air entering through the said air conduit for mixing the said air with the vaccine while conveying it toward the cage, thus maintaining a predetermined, constant proportion between a quantity of nebulized vaccine and the quantity of air entering said cage.

3. Vaccination equipment for vaccinating a relatively large number of chickens simultaneously against respiratory nerve virus infection by means of a vaccine carried by a fluid carrier comprising a substantially closed cage having a floor space relatively large with respect to the volume of the cage for confining and holding a number of chickens to be vaccinated on said floor space within a closed cage, a spraying unit for spraying and nebulizing a vaccine, enclosed within a spraying container partly filled with the vaccine carrier to be sprayed, a spraying nozzle in communication with that part of the container which is filled with the vaccine carrier, a source of air under pressure connected with the spraying nozzle said air when passing through the spraying nozzle forming a cloud, a connection between said cage and said spraying container, means for introducing a secondary air stream under pressure into the said connection, said secondary air stream moving said cloud and air from the closed spraying container towards and into the cage means for supplying said last named means with air under pressure from the aforesaid source of air under pressure, and means for detachably joining said spraying unit with said closed cage, the latter being provided with an opening for introducing into it the air stream carrying the nebulized vaccine carrier.

4. Mobile vaccination equipment as claimed in claim 3 wherein the cages consist of boxes subdivided into compartments each compartment being provided with a separate spraying unit.

5. Mobile vaccination equipment as claimed in claim 3 wherein a number of cages are stacked one upon the other for the simultaneous treatment of a large number of chickens, each having a separate spraying unit, but all cages being supplied with air from a common air conduit, connected with the common source of compressed air.

6. Mobile vaccination equipment as claimed in claim 3, wherein the entire equipment is mounted on a vehicle and wherein a number of cages are stacked on the vehicle, for the simultaneous immunization of a relatively large number of chickens, each cage being provided with a separate spraying unit, but all cages being supplied with air from a common air conduit, connected with a common source of compressed air.

7. Mobile vaccination equipment as claimed in claim 6, wherein the vehicle is provided with a container for compressed air and with a compressor for refilling said container.

8. Mobile vaccination equipment as claimed in claim 3, wherein a regulable valve and a filter is inserted between the source of compressed air, the spraying nozzle and the means for introducing a secondary air stream into the connection between the cage and the spraying container.

9. Vaccination equipment as claimed in claim 3, wherein the cage to which the spraying unit is attached is an incubator.

References Cited in the file of this patent
UNITED STATES PATENTS

| | | |
|---|---|---|
| 712,496 | Clark | Nov. 4, 1902 |
| 716,574 | Nimmo | Dec. 23, 1902 |
| 732,774 | McReynolds | July 7, 1903 |
| 1,714,635 | Schafer | May 28, 1929 |
| 2,593,134 | Gibbon | Apr. 15, 1952 |
| 2,605,087 | Dautrebande | July 28, 1952 |

OTHER REFERENCES

Cornell Veterinarian, vol. 41, No. 3, July 1951, page 280.

Science News Letter of August 19, 1950, page 121.